United States Patent [19]
Germano

[11] Patent Number: 5,967,668
[45] Date of Patent: Oct. 19, 1999

[54] CENTRAL BEARING FOR A REAR AXLE OF A MOTOR VEHICLE AND METHOD OF MAKING SAME

[75] Inventor: Francesco Germano, Bietigheim-Bissingen, Germany

[73] Assignee: Dr. Ing. h.c.f. Porsche AG, Weissach, Germany

[21] Appl. No.: 08/889,952

[22] Filed: Jul. 10, 1997

[30] Foreign Application Priority Data

Aug. 24, 1996 [DE] Germany .......................... 196 34 215

[51] Int. Cl.⁶ .................................................. F16C 17/02
[52] U.S. Cl. .......................................... 384/222; 267/293
[58] Field of Search .................................. 384/222, 220, 384/536, 582; 267/293

[56] References Cited

FOREIGN PATENT DOCUMENTS

| | | |
|---|---|---|
| 0 140 845 | 10/1984 | European Pat. Off. . |
| 2 407 399 | 9/1978 | France . |
| 2602292 | 2/1988 | France . |
| 404456 | 10/1924 | Germany . |
| 1 911 795 | 3/1969 | Germany . |
| 2611299 | 10/1976 | Germany . |
| 2625374 | 12/1976 | Germany . |
| 3028124 | 2/1981 | Germany . |
| 35 21 361 A1 | 6/1985 | Germany . |
| 37 41 440 A1 | 7/1988 | Germany . |
| 4033569 | 10/1991 | Germany . |
| 4112061 | 10/1992 | Germany . |
| 4419221 | 7/1995 | Germany . |
| 2 048 795 | 4/1980 | United Kingdom . |
| 2 056 382 | 6/1980 | United Kingdom . |

*Primary Examiner*—Lenard A. Footland
*Attorney, Agent, or Firm*—Evenson, McKeown, Edwards & Lenahan, PLL

[57] ABSTRACT

A central bearing for a rear axle of a motor vehicle consists of a U-shaped stirrup with whose free leg ends wheels are connected by receptacles. The central bearing consists of two elastic bearing elements fitted together, with a bearing axle located parallel to the crossbar of the rear axle stirrup. The bearing elements are held together by an annular stirrup and contained in a sleeve that is connected with a bearing bracket that can be fastened to the rear axle stirrup.

8 Claims, 3 Drawing Sheets

CENTRAL BEARING FOR A REAR AXLE OF A MOTOR VEHICLE AND METHOD OF MAKING SAME

BACKGROUND AND SUMMARY OF THE INVENTION

This application claims the priority of German application 196 34 215.5 filed in Germany on Aug. 24, 1996, the disclosure of which is expressly incorporated by reference herein.

The invention relates to a central bearing for a rear axle of a motor vehicle that includes a U-shaped stirrup with whose free leg ends wheels are connected by receptacles An elastic bearing for a wheel suspension is known from German Patent Document DE 26 25 374 A1 and comprises elastic annular elements that permit twisting of two axle ends of each wheel side connected together.

An object of the invention is to provide a rear axle for a motor vehicle with a central bearing that has a low construction cost and ensures specific characteristics in the lengthwise, transverse, and vertical directions.

This object is achieved according to the invention by providing an arrangement wherein the central bearing comprises two assembled elastic bearing elements that have a bearing axle in a bearing axle carrier located parallel to a crossbar of the rear axle stirrup; with the bearing elements being held in a sleeve and connected with a bearing bracket that can be fastened to the stirrup.

Primary advantages achieved with the invention are that the central bearing, consisting of two bearing elements, requires a low construction cost to manufacture and the characteristics in the various load directions can be adjusted accordingly when the two bearing elements are assembled.

In certain preferred embodiments of the invention, two individual bearing elements are clamped together by means of an overlapping annular strip mounted in turn in a sleeve that is part of a bearing bracket connected to the crossbar of a U-shaped stirrup of the rear axle.

Two diagonal supporting surfaces are formed on a bearing axle support, opposite which the supporting surfaces of the annular stirrup are located. The bearing elements are movable gimbal fashion between these supporting surfaces.

In the state of the two bearing elements that consist of elastic rings in which they are not subjected to tension, the tubular part of the bearing axle support projects by an amount that corresponds to the amount to which the elastic elements are squeezed together in the assembled state.

Cushions extending radially can serve as elastic stops, said cushions being formed by the two elastic bearing elements in the area where they come together and face the annular stirrup.

Other objects, advantages and novel features of the present invention will become apparent from the following detailed description of the invention when considered in conjunction with the accompanying drawings.

DETAILED DESCRIPTION OF THE DRAWINGS

Figure 1:
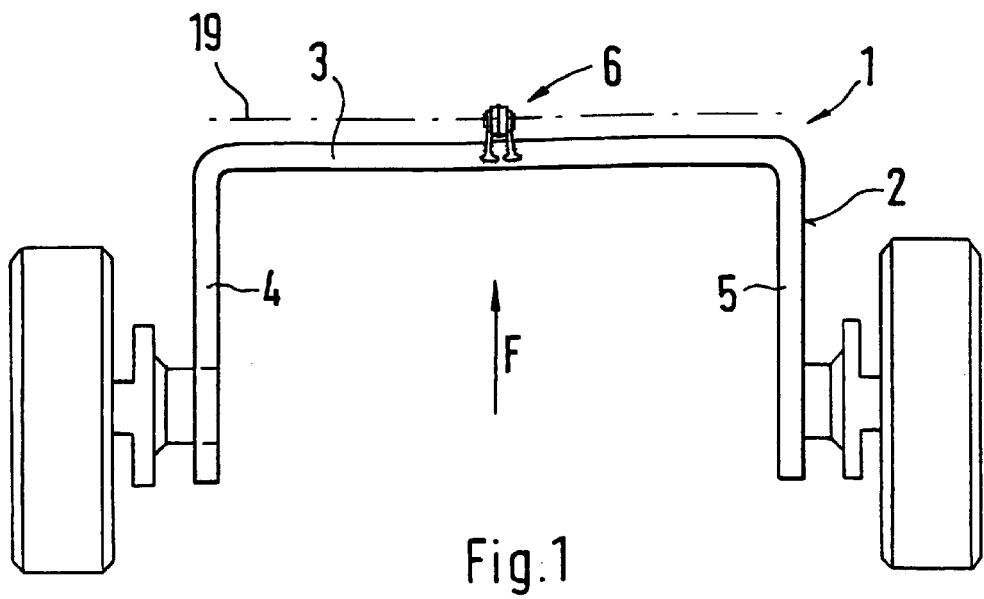
FIG. 1 is a schematic diagram of a rear axle for a motor vehicle with a central bearing, constructed according to preferred embodiments of the present invention.
Figure 2:
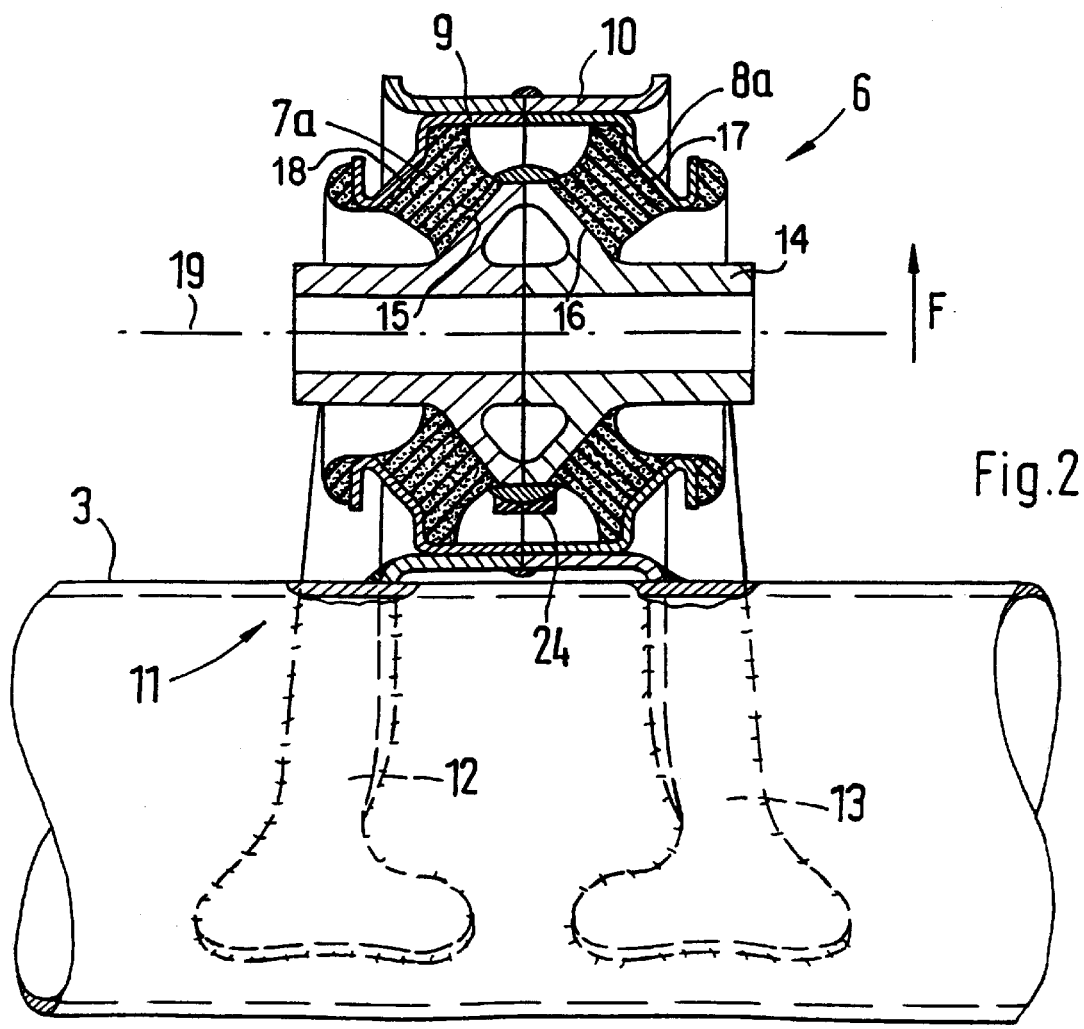
FIG. 2 is a horizontal section through the central bearing with a connection to the rear axle.

A rear axle 1 consists essentially of a U-shaped stirrup 2 with a crossbar 3 that extends in the transverse direction of the vehicle and legs 4 and 5 that are attached and extend in the lengthwise direction of the vehicle. The wheels are mounted on the free ends of these legs 4, 5 by wheel carrier receptacles. Rear axle 1 is mounted by a central bearing 6 to the vehicle body and can therefore pivot the wheels around a transverse axis and diagonal axes.

Central bearing 6 is formed by two separate bearing elements 7, 8, said elements being fastened and held together in an annular stirrup 9. Annular stirrup 9 in turn is located in a sleeve 10 of a bearing bracket 11. This sleeve is connected with crossbar 3 of rear axle 1 by arms 12, 13.

Bearing elements 7, 8 comprise elastic rings 7a, 8a which are secured on a bearing axle support 14 between molded supporting surfaces 15, 16 and supporting surfaces 17, 18 of the annular stirrup. These supporting surfaces 15, 16 are arranged approximately parallel to the other supporting surfaces 17, 18 and are located diagonally at an angle to bearing axle axis 19. The two supporting surfaces 15, 16 of bearing axle support 14 combine to form an approximately rectangular projecting supporting element S.

Figure 3:
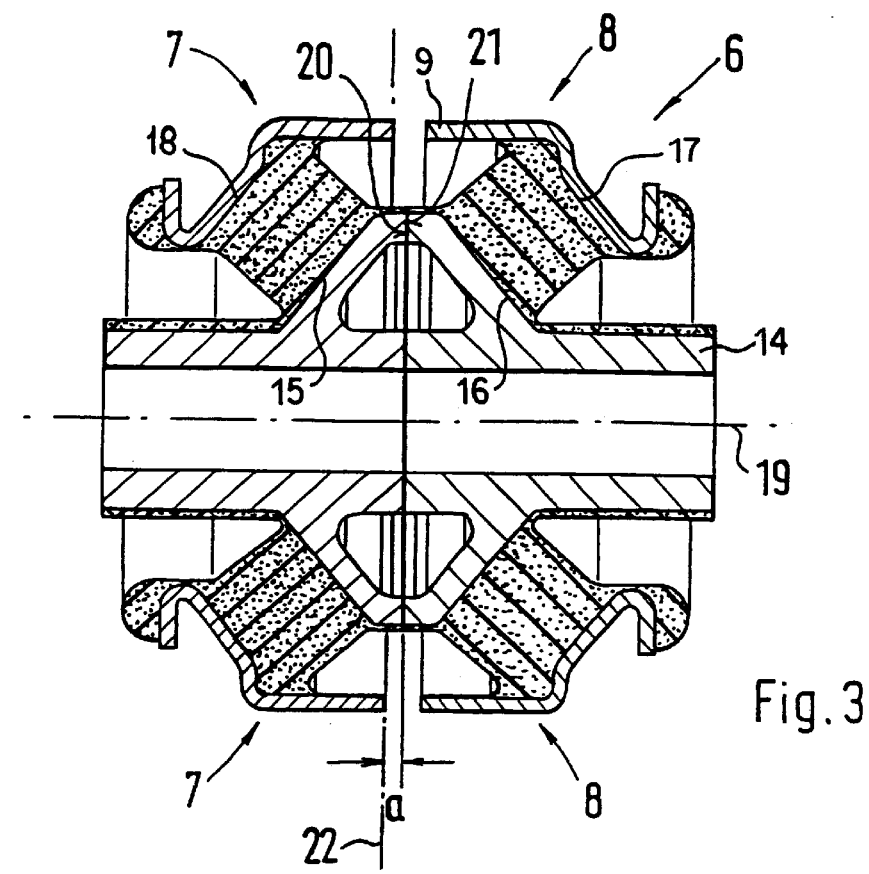
FIG. 3 is a section through the central bearing before the assembled state.
Figure 4:
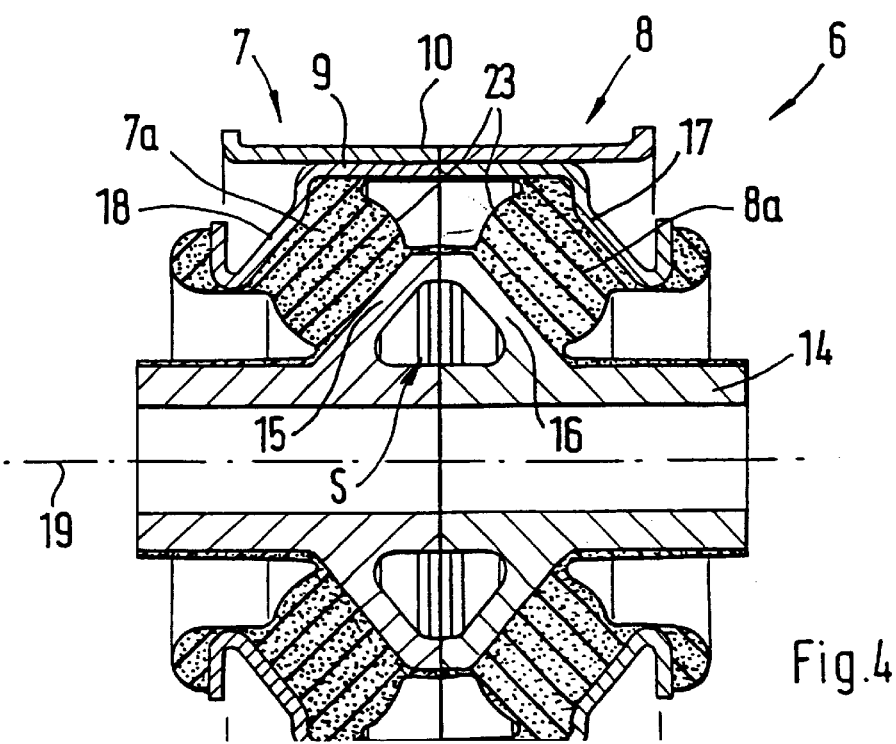
FIG. 4 is a section through the central bearing in the assembled state.
Figure 5:
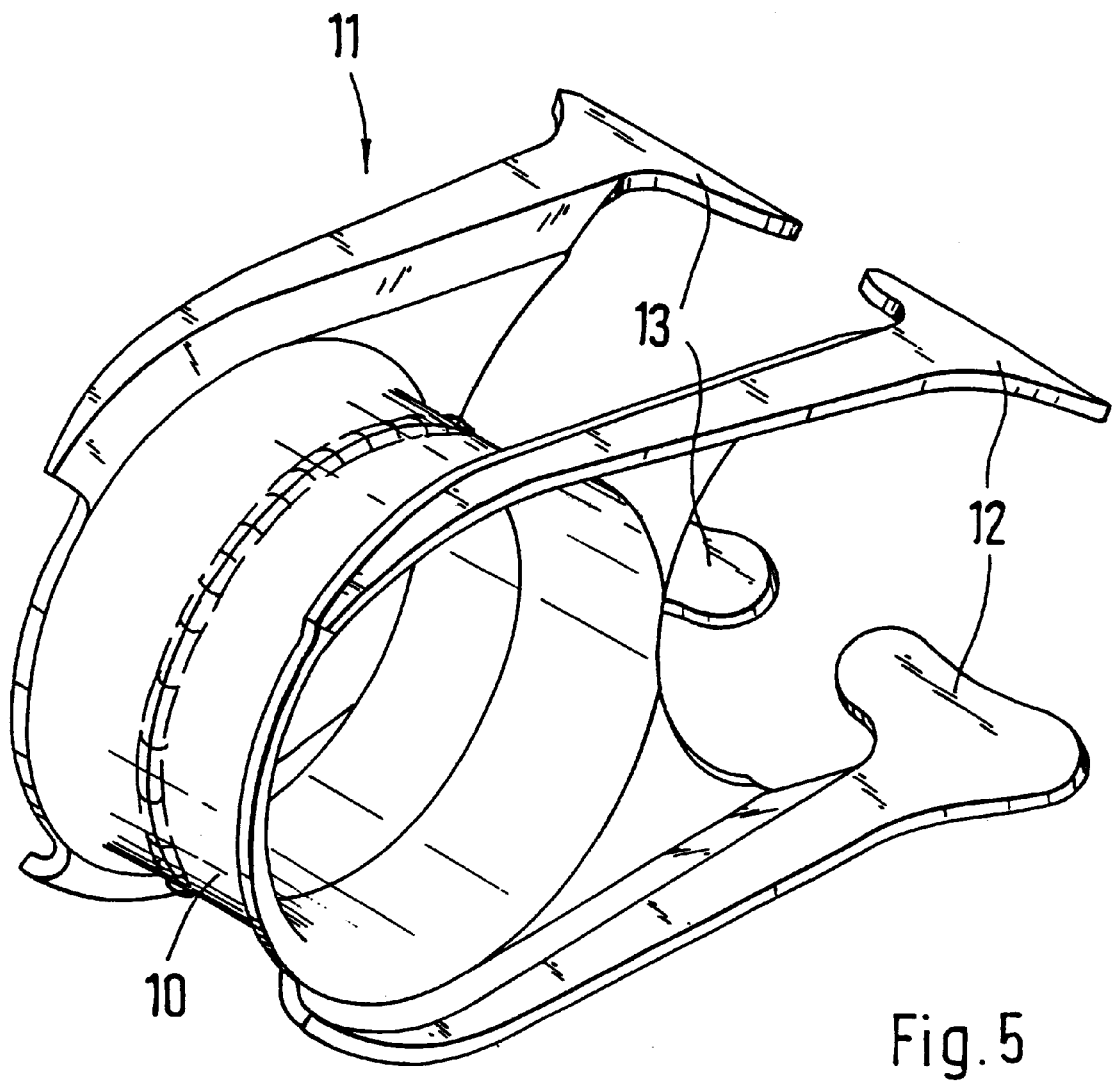
FIG. 5 is a perspective view of a bearing bracket that receives the central bearing.

As can be seen in FIG. 3 that shows a state of bearing elements 7, 8 in which they have not yet been assembled or subjected to tension, faces 20, 21 of bearing elements 7, 8 project for a distance a in front of the actual connecting plane 22. In the assembled state of bearing elements 7, 8 the elastic rings 7a, 8a are pressed together until beads 23 appear on elastic rings 7a, 8a that create a precondition for long-term elasticity.

A gimbal-like movement of the axle can be performed by means of central bearing 6, with proportional forces being accepted. In addition, certain forces in the vertical, transverse, and lengthwise directions can be accepted. Limitation of the movement of central bearing 1 in the lengthwise and vertical directions can be achieved by means of elastic stops 24.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Central bearing assembly for supporting a vehicle wheel support member, said central bearing assembly comprising:

a bearing axle carrier having a bearing axle carrier axis, a radial protection on the axle carrier which has respective first and second protection support surfaces at opposite axial ends of the projection which extend diagonally at an angle to the axle carrier axis, a stirrup assembly exhibiting a first stirrup support surface extending substantially parallel to and spaced from the first projection support surface and a second stirrup support surface extending substantially parallel to and spaced from the second projection support surface, a first elastic bearing element disposed between and abutting the first projection support surface and the first stirrup support surface, and a second elastic bearing element disposed between and abutting the second projection support surface and the second stirrup support surface, whereby said elastic bearing elements provide for elastic gimbal support of the bearing axle carrier with respect to the stirrup assembly, wherein the support surfaces are annular support surfaces surrounding the axle carrier axis, and wherein the first and second bearing elements are respective first and second elastic annular rings, wherein the stirrup assembly includes a first tubular member with said first stirrup support surface and a second tubular member with said second stirrup support surface, wherein said first annular elastic ring is clamped between the first stirrup support surface and the first projection support surface, wherein said second annular elastic ring is clamped between the second stirrup support surface and the second projection support surface, and wherein said elastic rings are compressively clamped between respective ones of the projection support surfaces with formation of beads on sides of the elastic rings extending between the projection support surfaces.

2. Central bearing assembly according to claim 1, wherein the annular rings each have an approximately rectangular cross section.

3. Central bearing assembly according to claim 2, wherein said first and second tubular members axially abut one another in an assembled condition of the central bearing assembly.

4. Central bearing assembly according to claim 1, wherein an overlapping elastic annular cushion is provided as an elastic radial stop at a location where said first and second annular elastic rings axially abut one another in an assembled condition of the central bearing assembly.

5. A support assembly for supporting a pair of vehicle wheels on a vehicle, including:

a U-shaped support frame having a central crossbar which in use extends in a transverse direction of a vehicle, and legs at respective ends of the crossbar for supporting wheel carrier receptacles, a sleeve, at least one arm connecting the central crossbar to the sleeve, and a central bearing assembly supported in the sleeve, said central bearing assembly comprising:

a bearing axle carrier having a bearing axle carrier axis, a radial projection on the axle carrier which has respective first and second projection support surfaces at opposite axial ends of the projection which extend diagonally at an angle to the axle carrier axis, a stirrup assembly exhibiting a first stirrup support surface extending substantially parallel to and spaced from the first projection support surface and a second stirrup support surface extending substantially parallel to and spaced from the second projection support surface, a first elastic bearing element disposed between and abutting the first projection support surface and the first stirrup support surface, and a second elastic bearing element disposed between and abutting the second projection support surface and the second stirrup support surface, whereby said elastic bearing elements provide for the elastic gimbal support of the bearing axle carrier with respect to the stirrup assembly, wherein the support surfaces are annular support surfaces surrounding the axle carrier axis, and wherein the first and second bearing elements are respective first and second elastic annular rings, wherein the stirrup assembly includes a first tubular member with said first stirrup support surface and a second tubular member with said second stirrup support surface, wherein said first annular elastic ring is clamped between the first stirrup support surface and the first projection support surface, wherein said second annular elastic ring is clamped between the second stirrup support surface and the second projection support surface, and wherein said elastic rings are compressively clamped between respective ones of the projection support surfaces with formation of beads on sides of the elastic rings extending between the projection support surfaces.

6. A support assembly according to claim 5, wherein the annular rings each have an approximately rectangular cross section.

7. A support assembly according to claim 6, wherein said first and second tubular members axially abut one another in an assembled condition of the central bearing assembly.

8. Central bearing assembly according to claim 5, wherein an overlapping elastic annular cushion is provided as an elastic radial stop at a location where said first and second annular elastic rings axially abut one another in an assembled condition of the central bearing assembly.

* * * * *